(12) United States Patent
Kuroda

(10) Patent No.: US 6,337,744 B1
(45) Date of Patent: Jan. 8, 2002

(54) METHOD AND APPARATUS FOR PRINT PROCESSING, AND STORAGE MEDIUM

(75) Inventor: Shigeki Kuroda, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,601

(22) Filed: Dec. 2, 1998

(30) Foreign Application Priority Data

Dec. 3, 1997 (JP) .............................................. 9-333318

(51) Int. Cl.$^7$ .............................................. G06H 15/00
(52) U.S. Cl. ..................... 358/1.13; 358/1.18
(58) Field of Search ........................ 358/1.1, 1.2, 1.15, 358/1.18; 707/517, 520, 522, 523, 525, 527, 515, 500, 505, 530; 345/629, 619; 382/175, 284

(56) References Cited

U.S. PATENT DOCUMENTS 5,822,510 A * 10/1998 LeClair et al. ............. 358/1.18
6,046,818 A * 4/2000 Benson ....................... 358/1.18

* cited by examiner

Primary Examiner—Arthur G. Evans
(74) Attorney, Agent, or Firm—Fitzpatrick, Cella, Harper & Scinto

(57) ABSTRACT

To perform page-layout printing, intermediate data having a data form different from print data is generated. The generated intermediate data is controlled in logical page unit, and the logical pages are edited in accordance with the page layout. On a physical page, a plurality of logical pages are reduced and laid out. A character print command, an image rendering command, and a graphic rendering command are replaced with predetermined data by the intermediate-data replacement editing process so as to reduce the amount of data to be outputted. As a result, the amount of data conversion at the time of printing an outline of contents of the page is reduced, and printing time can be reduced.

21 Claims, 13 Drawing Sheets

FIG.3

```
[JOB START COMMAND] ····  [CHARACTER PRINT COMMAND]  [CHARACTER PRINT COMMAND] ·····
[GRAPHIC RENDERING COMMAND] ····  [CHARACTER PRINT COMMAND]  [CHARACTER PRINT COMMAND] ····  [CHARACTER PRINT COMMAND] ·····
[PAGE BREAK COMMAND]  [CHARACTER PRINT COMMAND]  [CHARACTER PRINT COMMAND] ····  [CHARACTER PRINT COMMAND] ·····
[PAGE BREAK COMMAND]  [CHARACTER PRINT COMMAND]  [CHARACTER PRINT COMMAND] ····  [IMAGE RENDERING COMMAND] ····  [CHARACTER PRINT COMMAND]
[CHARACTER PRINT COMMAND]  [CHARACTER PRINT COMMAND] ····  [CHARACTER PRINT COMMAND]  [CHARACTER PRINT COMMAND]
[PAGE BREAK COMMAND]  [CHARACTER PRINT COMMAND]  [CHARACTER PRINT COMMAND]  [JOB END COMMAND]
```

METHOD AND APPARATUS FOR PRINT PROCESSING, AND STORAGE MEDIUM

BACKGROUND OF THE INVENTION

Present invention relates to a print processing method and apparatus for obtaining a desired print result by instructing page control operation in a system, inclusive of a printer having a function to print, in page unit, and a data processing apparatus, e.g., a personal computer or the like, connected to the printer. The present invention also relates to a storage medium storing program codes readable by a data processing apparatus.

Among conventional print processing, a well-known method is to preview a layout of output contents of a print page by a data processing apparatus utilizing application software having a print-preview function as a method to confirm outline of output contents of the print page. Such conventional print processing is adopted by the system including a printer having a function to print, in page unit, and a data processing apparatus, e.g., a personal computer or the like, connected to the printer.

Furthermore, another known method of page layout printing for confirming outline of output contents of a print page is to reduce the size of a plurality of pages (N pages) so as to be laid out in one page (a sheet of print paper). When printing in page-layout mode is designated, a printer-control-command generating program (printer driver) generates a printer control command (print data) for N pages of print data to be outputted in a sheet of print paper, and the generated data is transmitted to the printer.

However, in a case where the application software does not include the aforementioned print-preview function, the above method cannot be used. In that case, the outline of output contents of an entire page cannot be determined. Furthermore, when an operator instructs printing in page-layout mode to confirm the outline of output contents of the print page in actual print operation, the printer-control-command generating program (printer driver) generates the printer control command (print data) for the entire N pages of print information for outputting a sheet of print paper and the generated data is transmitted to the printer. As a result, a large amount of time is required for printing.

SUMMARY OF THE INVENTION

The present invention is made in consideration of the above situation, and has as its object to provide a print processing method and apparatus, and a storage medium storing program codes readable by a data processing apparatus, for printing an outline of output contents of an entire page in page-layout printing operation by replacing a character in document data with a predetermined character, replacing an image in document data with a rectangular graphic including the image, or replacing a group of graphic data in the document data with a rectangular graphic, whereby reducing the amount of output data, thus reducing printing time.

To attain the above object, the present invention has the following construction.

More specifically, a print processing method according to the present invention is characterized by comprising: a print mode designating step of designating a print mode; a print designating step of designating print data to be transmitted to a printing apparatus based on instruction of print execution; a page control determining step of determining whether or not page control is to be performed in accordance with the designated print mode; an intermediate data generating step of generating intermediate data from the print data for performing page control based on a determination result of said page control determining step; a storing step of storing the generated intermediate data; a page data recording step of recording page data corresponding to the intermediate data; an intermediate data editing step of editing the stored intermediate data in accordance with the designated print mode; an intermediate data replacing step of replacing the stored intermediate data; an intermediate data outputting step of outputting intermediate data edited in said intermediate data replacing step; a print data generating step of generating final print data based on the outputted intermediate data and the page data corresponding to the intermediate data; and a print data outputting step of outputting the generated final print data.

Furthermore, print processing apparatus according to the present invention is characterized by comprising: print mode designating means for designating a print mode; print designating means for designating print data to be transmitted to a printing apparatus based on instruction of print execution; page control determining means for determining whether or not page control is to be performed in accordance with the designated print mode; intermediate data generating means for generating intermediate data from the print data for performing page control based on a determination result of said page control determining means; storing means for storing the generated intermediate data; page data recording means for recording page data corresponding to the intermediate data; intermediate data editing step of editing the stored intermediate data in accordance with the designated print mode; intermediate data replacing means for replacing the stored intermediate data; intermediate data outputting means for outputting intermediate data edited by said intermediate data replacing means; print data generating means for generating final print data based on the outputted intermediate data and the page data corresponding to the intermediate data; and print data outputting means for outputting the generated final print data.

Still further, a computer readable storage medium according to the present invention is characterized by comprising: program steps of print mode designating means for designating a print mode; program steps of print designating means for designating print data to be transmitted to a printing apparatus based on instruction of print execution; program steps of page control determining means for determining whether or not page control is to be performed in accordance with the designated print mode; program steps of intermediate data generating means for generating intermediate data from the print data for performing page control based on a determination result of said page control determining means; program steps of storing means for storing the generated intermediate data; program steps of page data recording means for recording page data corresponding to the intermediate data; program steps of intermediate data editing step of editing the stored intermediate data in accordance with the designated print mode; program steps of intermediate data replacing means for replacing the stored intermediate data; program steps of intermediate data outputting means for outputting intermediate data edited by said intermediate data replacing means; program steps of print data generating means for generating final print data based on the outputted intermediate data and the page data corresponding to the intermediate data; and program steps of print data outputting means for outputting the generated final print data.

According to an aspect of the aforementioned print processing method, a plurality of pages are reduced to be laid out in one page in said intermediate data editing step.

According to an aspect of the aforementioned print processing method, if the intermediate data is a character print command, the character code is replaced with a predetermined character code in said intermediate data replacing step.

According to an aspect of the aforementioned print processing method, if the intermediate data is an image rendering command, the image rendering command is replaced with a rectangular rendering command in said intermediate data replacing step.

According to an aspect of the aforementioned print processing method, if the intermediate data is a graphic rendering command, the graphic rendering command is replaced with a rectangular rendering command in said intermediate data replacing step.

According to an aspect of the aforementioned print processing method, the print mode designation and the print execution instruction are performed by a keyboard.

According to an aspect of the aforementioned print processing method, the print mode designation and the print execution instruction are performed by a pointing device.

According to an aspect of the aforementioned print processing apparatus, said intermediate data editing means reduces a plurality of pages to be laid out in one page.

According to an aspect of the aforementioned print processing apparatus, said intermediate data replacing means replaces a character code with a predetermined character code if the intermediate data is a character print command.

According to an aspect of the aforementioned print processing apparatus, said intermediate data replacing means replaces an image rendering command with a rectangular rendering command if the intermediate data is an image rendering command.

According to an aspect of the aforementioned print processing apparatus, said intermediate data replacing means replaces a graphic rendering command with a rectangular rendering command if the intermediate data is a graphic rendering command.

According to an aspect of the aforementioned print processing apparatus, the print mode designation and the print execution instruction are performed by a keyboard.

According to an aspect of the aforementioned print processing apparatus, the print mode designation and the print execution instruction are performed by a pointing device.

According to an aspect of the aforementioned storage medium, the storage medium further comprises a program for causing said intermediate data editing means to reduce a plurality of pages to be laid out in one page.

According to an aspect of the aforementioned storage medium, the storage medium further comprises a program for causing said intermediate data replacing means to replace a character code with a predetermined character code if the intermediate data is a character print command.

According to an aspect of the aforementioned storage medium, the storage medium further comprises a program for causing said intermediate data replacing means to replace an image rendering command with a rectangular rendering command if the intermediate data is an image rendering command.

According to an aspect of the aforementioned storage medium, the storage medium further comprises a program for causing said intermediate data replacing means to replace a graphic rendering command with a rectangular rendering command if the intermediate data is a graphic rendering command.

According to an aspect of the aforementioned storage medium, the storage medium further comprises a program for designating and instructing a data processing apparatus to execute the print mode and print execution designated by a keyboard.

According to an aspect of the aforementioned storage medium, the storage medium further comprises a program for designating and instructing a data processing apparatus to execute the print mode and print execution designated by a pointing device.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a view showing data necessary for print processing;

DETAILED DESCRIPTION OF THE PREFERRED EMBODIMENTS

Preferred embodiments of the present invention will be described in detail in accordance with the accompanying drawings.

[First Embodiment]

Figure 1:
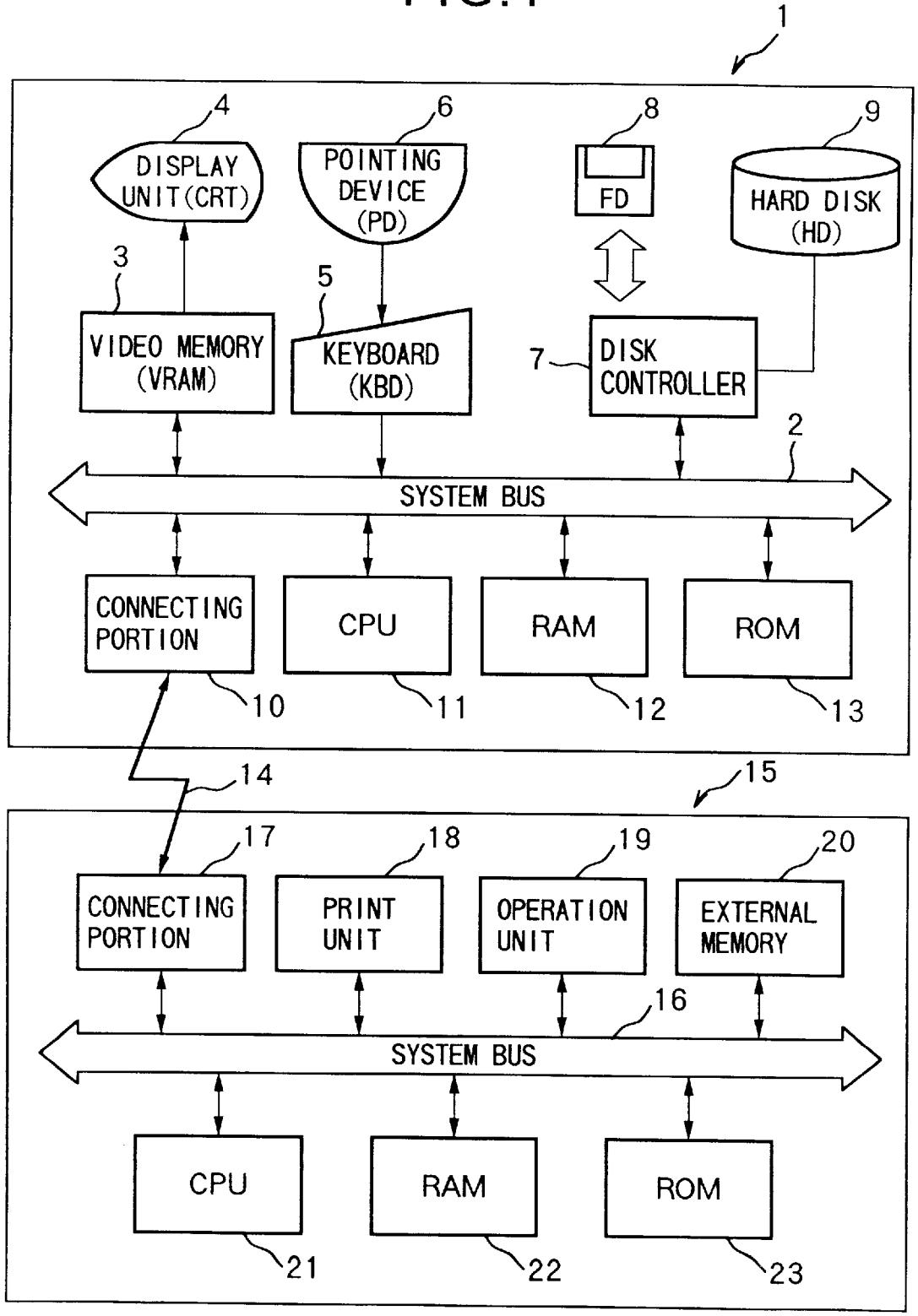
FIG. 1 is a block diagram showing a construction of a print processing apparatus according to an embodiment of the present invention.

FIG. 1 is a block diagram showing a construction of a print processing apparatus according to the first embodiment. Referring to FIG. 1, reference numeral 1 denotes a data processing apparatus, e.g., a personal computer or the like, which primarily comprises video memory (VRAM) 3, a display unit (CRT) 4, a keyboard (KBD) 5, a pointing device (PD) 6, disk controller 7, hard disk (HD) 9, a connecting portion 10, CPU 11, RAM 12, and ROM 13 all of which will be described later. These components are connected via system bus 2.

The CPU 11 controls the entire data processing apparatus 1 according to a program which will be described later with reference to the flowchart in FIG. 2.

Moreover, the RAM 12, serving as a main memory of the CPU 11, stores programs, and has a temporary storage area for storing various data, which is used as a work area when the CPU 11 executes control processing.

The disk controller 7 executes access control for accessing an external memory device such as the hard disk (HD) 9 or a floppy disk (FD) 8 provided as an external memory.

The hard disk device (HD) 9 and floppy disk (FD) 8 are provided for recording data in a magnetic storage medium on the disk and reading/writing the data, and for storing various graphic data, text data, boot programs for the data processing apparatus 1 executed by being downloaded to the RAM 12, operating system (OS) serving as a control program of the CPU 11, various application programs, a printer-control-command (print data) generating program (printer driver), and a printing system program including page control function.

Not only the hard disk device or floppy disk, but also a magnetic tape, CD-ROM, an IC memory card, a digital video disk (DVD) or the like may serve as the storage medium.

The ROM 13, serving as an internal memory, stores various data and programs, as similar to the aforementioned hard disk device (HD) 9 and floppy disk (FD) 8.

The display unit 4, comprising a CRT (cathode-ray tube), liquid crystal or ferroelectric liquid crystal (FLC) or the like, displays various graphics such as bit map data, a command image of a command menu, operators messages or the like on the screen of the data processing apparatus 1.

The video memory 3 stores data to be displayed on the display unit 4.

The keyboard 5 and pointing device 6 are operated by an operator for inputting various data, command, a print mode or the like. By selecting a command image from the command menu displayed on the screen of the display unit 4 with the keyboard 5 or pointing device 6, an operator can instruct execution of the command or select a print mode.

The connecting portion 10 connects with a connecting portion 17 of a print processing apparatus 15 through a predetermined bi-directional interface unit 14, e.g., centronics interface or network interface or the like, for controlling communication with the print processing apparatus 15, such as transmission of a printer control command (print data), which will be described later.

The print processing apparatus 15 primarily comprises a connector 17, a print unit (printer engine) 18, an operation unit 19, an external memory 20, CPU 21, RAM 22 and ROM 23, all of which are connected via system bus 16.

The CPU 21 is a printer CPU for controlling the entire print processing apparatus 15. The CPU 21 transmits image signals, indicative of a printer control command (print data) received by the connector 17, to the print unit 18 in accordance with a control program stored in the external memory 20.

The RAM 22, serving as a main memory of the CPU 21, has a temporary storage area for storing various data, which is used as a work area when the CPU 21 executes control processing.

The external memory 20, which may be connected optionally, stores font data, emulation programs, form data or the like.

The ROM 23, serving as an internal memory of the printer, stores various data and printer control programs for controlling the print processing apparatus.

Moreover, the print unit 18 is a printer engine controlled by the CPU 21. The print unit 18 receives image signals outputted by the control programs, stored in the ROM 23 or external memory 20, through system bus to perform actual printing.

The operation unit 19, where operation is received or operation results are displayed, comprises an input portion such as an operation panel and operation switches or the like, and a display portion such as an LED or liquid crystal panel or the like. An operator can instruct or confirm setting of the print processing apparatus 15 through the operation unit 19.

The connector 17, connected with the connector 10 of the data processing apparatus 1 through the bi-directional interface 14, can receive a printer control command (print data) or inform the state of printer.

Next, the operation step of the print processing apparatus having the page control function according to the present embodiment will be described with reference to FIGS. 1, 11 and 12.

The print processing apparatus according to the present embodiment is operated by executing a basic I/O program 1101, operating system (OS) 1102, and print processing program 1103 by the CPU 21. The basic I/O program 1101 is stored in the ROM 13; and the operating system (OS) 1102 is stored in an external memory such as hard disk (HD) 9 or floppy disk (FD) 8.

When power of the data processing apparatus 1 is turned on, the operating system (OS) 1102 stored in the external memory such as hard disk (HD) 9 or floppy disk (FD) 8 or the like is loaded to the RAM 12 by an initial program loading (IPL) function of the basic I/O program 1101, and the OS is started.

Next, an operator selects a command image from the command menu displayed on the screen of the display unit 4 with the keyboard 5 and pointing device 6 to instruct execution of an application program. The application program stored in the external memory such as the hard disk (HD) 9 or floppy disc (FD) 8 or the like is loaded to the RAM 12, and the application program 1104 is started.

When an operator instructs printing in the manner similar to the above-described steps of starting an application program, the print processing program including the page control function and printer-control-command generating program (printer driver), stored in the external memory such as hard disk (HD) 9 or floppy disk (FD) 8, are loaded to the RAM 12, and the print processing system starts operating.

In the present embodiment, the print processing program 1103 and related data are stored in the floppy disk (FD) 8. Contents thereof are shown in FIG. 12.

The print processing program 1103 and related data stored in the floppy disk (FD) 8 may be loaded to the data processing apparatus 1 through the disk controller 7. When the floppy disk is set in the disk controller 7, the print processing program and related data are read out of the floppy disk (FD) 8 by the control processing of the OS 1102 and basic I/O program 1101, and loaded to the RAM 12.

Figure 11:
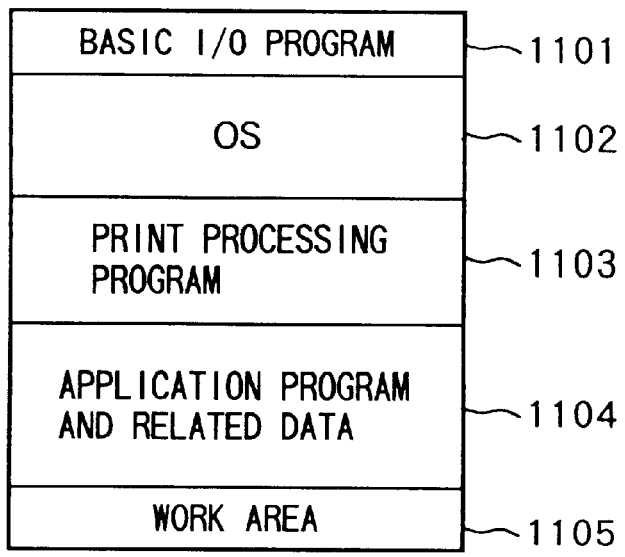
FIG. 11 is a memory map of a storage medium according to the embodiment of the present invention.
Figure 12:
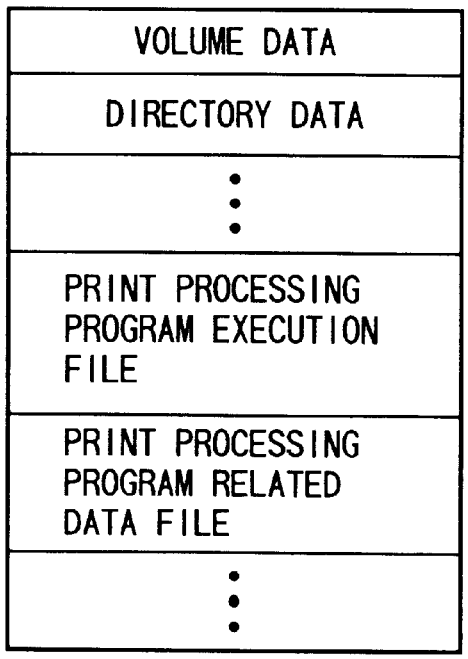
FIG. 12 is a memory map of a storage medium according to the embodiment of the present invention.

FIG. 11 is a memory map showing the state where the print processing program is loaded to the RAM 12 and become executable.

Next, the method of operating the print processing apparatus having the page control function according to the present embodiment is described with reference to FIGS. 2 to 8 showing flowcharts and an explanatory view of a data form.

Note that this process begins after the program for printing, e.g., application program 1104, is started.

When print processing of document data is designated by the application program, and if a character-replacing print mode and a page layout print mode are designated, an intermediate-data writing program converts document data sent by the application program into intermediate data, temporarily stores the intermediate data as an intermediate data file, and generates a page data file in which page data is recorded.

An intermediate-data reading program reads each of the intermediate data files. If the intermediate data is a character print command, the character code is replaced with a specific character code and outputted. Then, page layout processing is performed to print a page layout.

The intermediate-data reading program outputs the intermediate data to the printer-control-command generating program (printer driver) or to a program executed in the previous step. Then, the printer-control-command generating program (printer driver) generates a printer control command (print data) and printing is performed.

Figure 2:
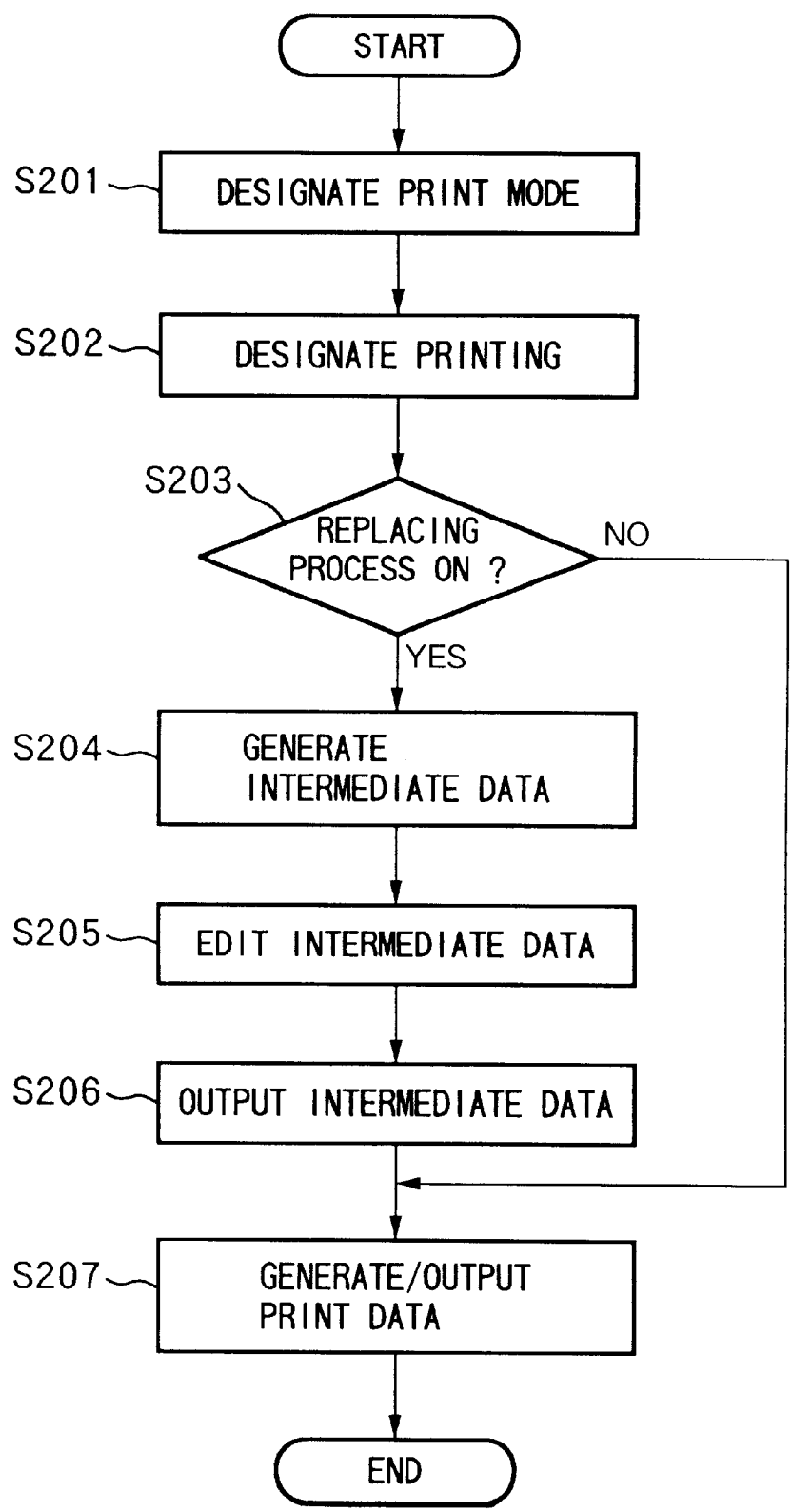
FIG. 2 is a flowchart showing a process of the print processing apparatus.

FIG. 2 is a flowchart showing steps of print processing according to the present embodiment.

In step S201 in FIG. 2, a mode (print mode) is designated to select whether or not to activate the character replacing mode for realizing print processing according to the present embodiment. Also, parameters of the page-layout print function, and a print mode such as the print order or the number of pages (C) to be laid out in a sheet of paper is designated.

In step S202, printing operation is designated. A print mode and printing operation may be designated by selecting a command image from the command menu displayed on the screen of the display unit 4 with the keyboard 5 and pointing device 6.

In step S203, it is determined whether or not the print mode designated in step S201 designates the character replacing process (ON). If the character replacing process is ON, the process proceeds to step S204 where intermediate data is generated. If the character replacing process is OFF in step S203 (replacement not designated), the steps of character replacing process in the print processing system are skipped, and the process proceeds to step S207.

In step S207, a printer control command (print data) is generated and outputted to the printer. This processing is performed in the normal printing step of the printer-control-command generating program (printer driver).

In step S204, intermediate data is generated, and the intermediate data is edited in step S205. Further in step S206, the intermediate data is outputted to the printer driver.

Next, the method of generating intermediate data in step S204 is described with reference to FIGS. 3 to 5.

FIG. 3 shows a document-data rendering command, sent from the application program 1104 (FIG. 11) to the print processing apparatus, when print execution is designated in step S202 in FIG. 2.

As shown in FIG. 3, the rendering command starts from [job start command] and ends at [job end command]. The rendering command includes, for instance, [character print command], [graphic rendering command], [image rendering command], [page break command] and so on.

Each command includes parameter data. For instance, [character print command] includes the character type, character codes, coordinates of a character print position, character width, character height, character spacing, line spacing and so forth.

[Graphic rendering command] includes the type of graphic to be rendered, the attribute of each rendering graphic, coordinates data of rendering position and so on.

[Image rendering command] includes bit map data, the width and height of the image, and coordinates data of rendering position.

Figure 4:
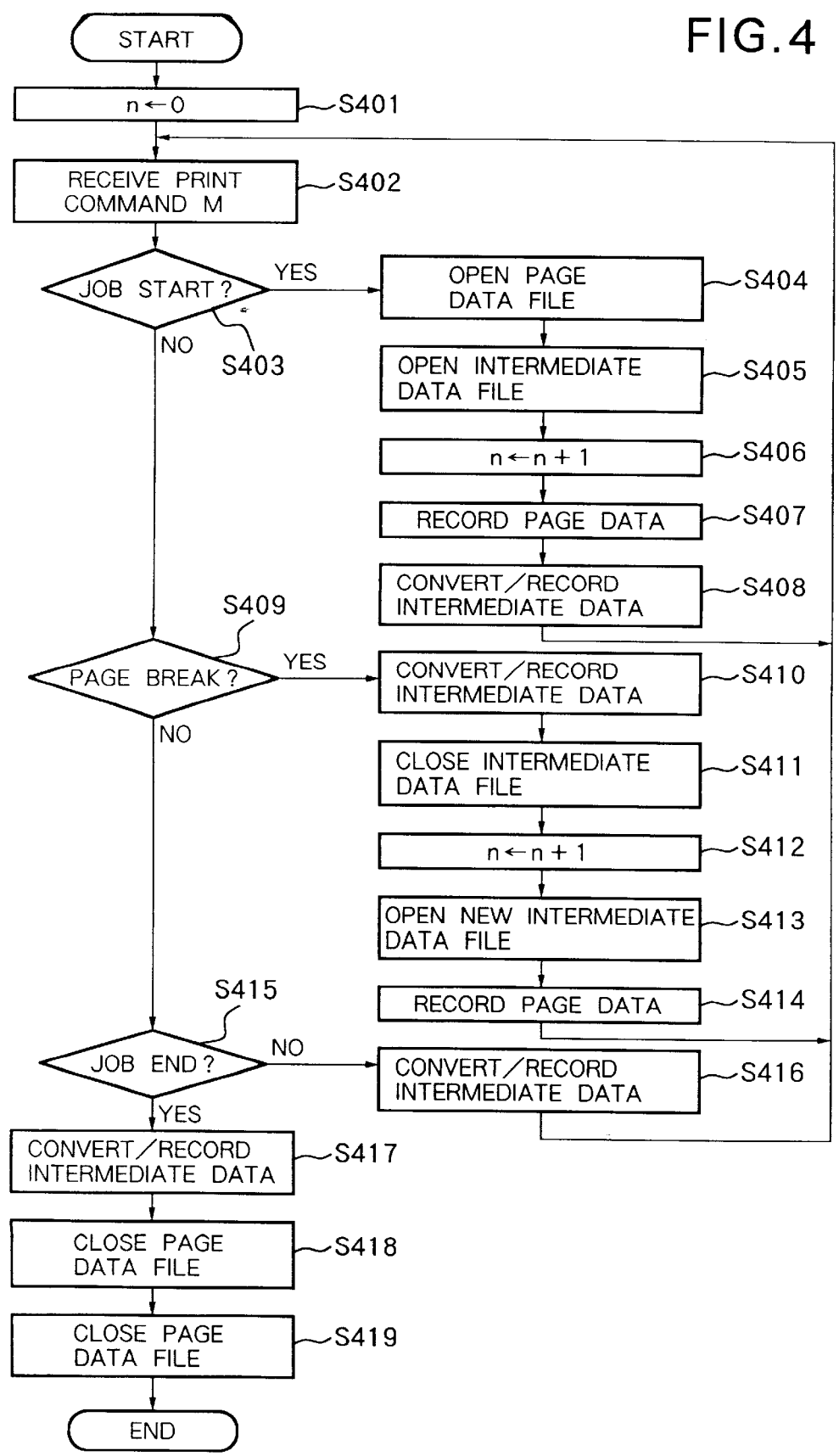
FIG. 4 is a flowchart showing the process of generating intermediate data.

FIG. 4 is a flowchart showing the intermediate-data generating step in step S204, i.e., the process of generating intermediate data based on the rendering command in FIG. 3.

In step S401 in FIG. 4, the page count n is initialized to 0.

In step S402, the rendering command shown in FIG. 3 is received and set to M.

In step S403, it is determined whether or not the rendering command M received in step S402 is the [job start command]. If the rendering command M received in step S403 is [job start command], the process proceeds to step S404 where a page data file is opened for recording the page data.

In step S405, the intermediate data file is opened for temporarily storing the first page of intermediate data.

In step S406, the page count n is incremented by one (n+1). In step S407, the page number n and the file name Pn of the intermediate data file opened in step S404 are recorded as page data. Furthermore in step S408, the received rendering command M is converted to intermediate data and recorded in the opened intermediate data file.

Then, the process returns to step S402 where the next rendering command is received and the newly received rendering command is set to M.

In a case where the received rendering command M in step S403 is not the [job start command], the process proceeds to step S409 to determine whether the command M is [page break command].

If it is determined in step S409 that the command M is [page break command], the process proceeds to step S410 where the command M is converted to intermediate data and printed, similar to the process in step S408.

Then, in step S411, the $n^{th}$ page of intermediate data file currently being recorded is closed.

In step S412, the page count n is incremented by one (n+1). Further in step S413, an intermediate data file for temporarily storing the $n^{th}$ page of intermediate data is newly opened. In step S414, the page number n and the file name Pn of the intermediate data file opened in step S413 are recorded as page data.

Then, the process returns to step S402 where the next rendering command is received and the newly received rendering command is set to M.

In a case where the command M is not the [page break command] in step S409, the process proceeds to step S415 where it is determined whether or not the command M is [job end command].

If it is determined in step S415 that the command M is not the [job end command], the process proceeds to step S416 where the rendering command is converted to intermediate data and recorded. Then, the process returns to step S402 where the next rendering command is received and the newly received rendering command is set to M.

If it is determined in step S415 that the command M is the [job end command], the process proceeds to step S417 where the command M is converted to intermediate data and recorded.

In step S418, the intermediate data file, where the currently referring intermediate data is temporarily stored, is closed. In step S419, the page data temporary storage file where page data is recorded is closed and the process ends.

Next, the method of recording page data in steps S407 and S414, and the method of converting a command into intermediate data and recording thereof in step S417 are described with reference to FIG. 5. FIG. 5 is a table showing a construction of the intermediate data file, and is stored in the storage device such as hard disk device 9 in FIG. 1.

Figure 5:
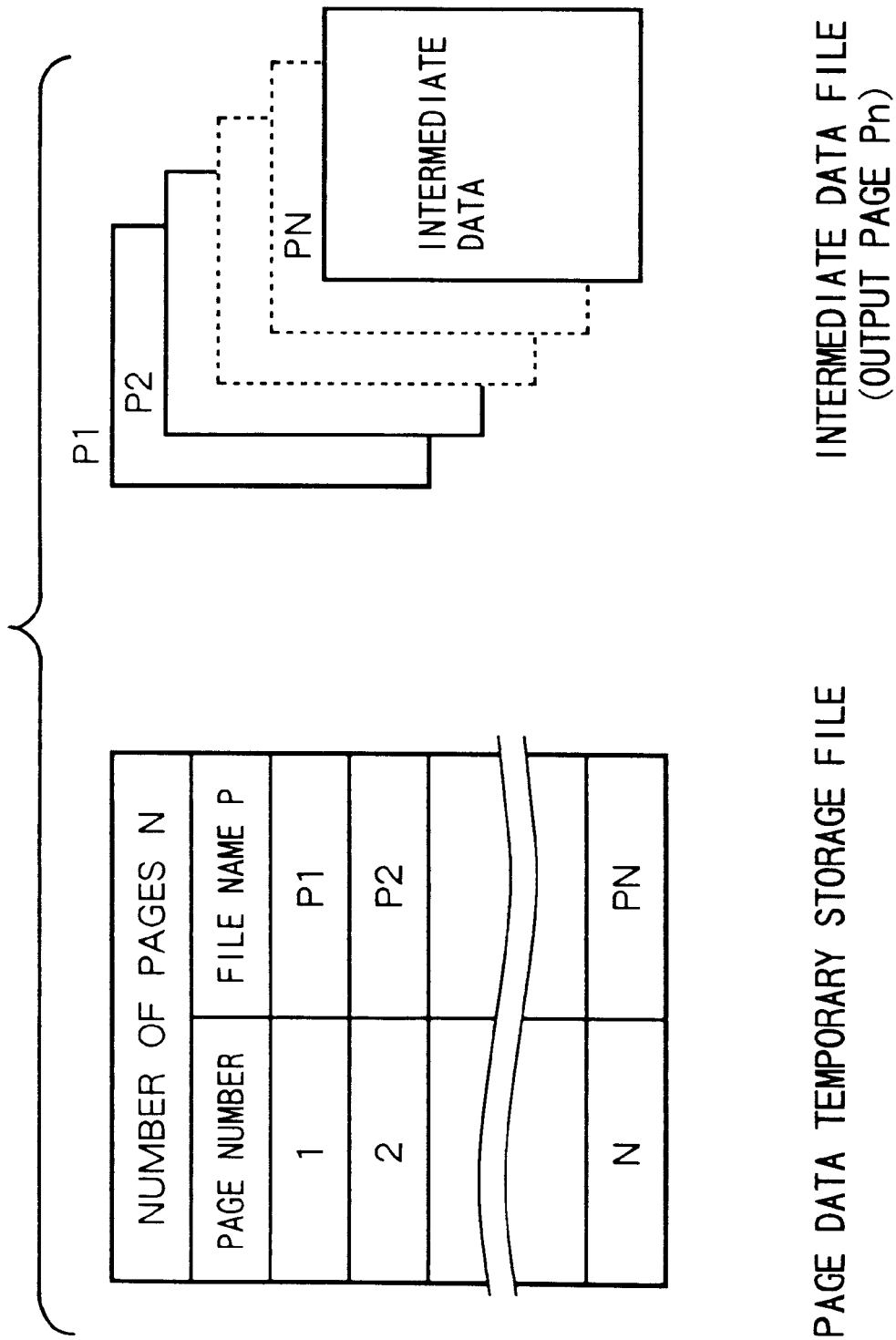
FIG. 5 is an explanatory view showing a construction of data files necessary for print processing.

Referring to FIG. 5, the temporary storage file comprises a page data temporary storage file for recording page data and an intermediate data file for recording intermediate data in page unit.

In the page data temporary storage file, page data is stored in step S407 and S414 when a new page is opened or page break is executed. The current page number N and the file name PN of the intermediate data file corresponding to page N are recorded. For instance, in FIG. 5, the file name P1 is a file having the first page of intermediate data. The page counter n is updated each time page data is recorded; ultimately, the total page number N is recorded in the counter n.

The intermediate data file is an area where intermediate data is recorded after the above rendering command is replaced with another form of command. The intermediate data file is generated for each page delimited by [page break command] or the like included in the rendering command in FIG. 3. Furthermore, a plurality of rendering commands may together be represented by intermediate data.

Next, the step of editing intermediate data in step S205 in FIG. 2 is described with reference to flowcharts in FIGS. 6 to 8.

Figure 6:
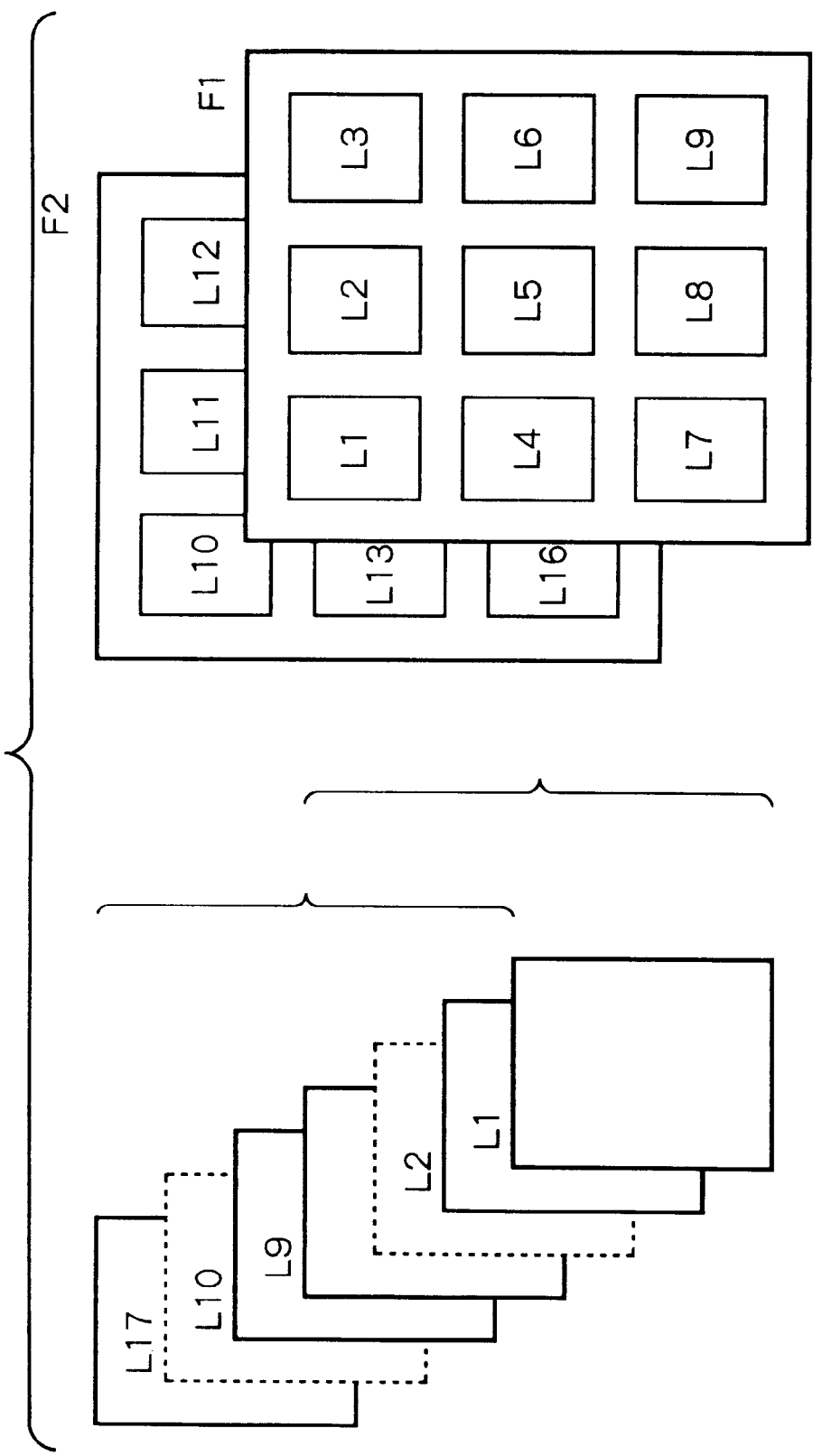
FIG. 6 is a conceptual view showing pages necessary for print processing.

FIG. 6 is a conceptual view for explaining the page-layout print function in the intermediate-data editing step. Referring to FIG. 6, each of L1 to L17 denotes a logical page Ln. Since it is assumed that n=1 to 17 in this example, 17 output pages are shown. Further, F1 and F2 denote pages actually outputted to the printer, which will be referred to as a physical page Fn. Data in each page of the logical pages Ln is reduced and laid out in a sheet of physical page. Moreover, assuming that the number of logical pages laid out in a sheet of physical page is C, the physical page Fn and the number C of logical pages can be expressed by Fn(C-up). Herein, for example, a page layout in the ascending order (page 1 to 17) is indicated as "up" and a page layout in the descending order (page 17 to 1) is indicated as "down". In the example in FIG. 6, it is assumed that C=9, thus nine logical pages are reduced in its size and laid out in a sheet of physical page. In FIG. 6, although the first page of logical page L1 is positioned on the upper left, then L2 and L3 arranged to its right, and L4 and L5 arranged in the subsequent columns, the direction of layout is not limited to this example according to the page-layout print function. Other layouts are possible, e.g. arranging pages from the top right to the bottom, then to the left column, or arranging pages from the top left to the bottom, then to the right column. Moreover, the number of logical pages C which can be laid out on a sheet of physical page is not limited to nine pages, but other number of pages may be arranged, e.g., C=4, 8, 16 . . . In other words, not only 9 pages, but 2 pages (2-up), 4 pages (4-up), 8 pages (8-up), 16 pages (16-up) and so forth may be arranged on the physical page. Herein, the page number N' of the physical page Fn is expressed by the quotient (N/C). In a case where the number of logical page is set to one page (1-up), one page of data is recorded in the normal size on a sheet of paper, as similar to the case of not performing the page layout processing.

The page number of the above-described intermediate data, the logical page Ln, physical page Fn are described with reference to FIG. 5. The intermediate data file in FIG. 5 is generated in the order of rendering command outputted by the application program in FIG. 3. The page number of the intermediate data file matches the page number outputted by the application program. The logical page Ln is a rearranged page number of the intermediate data for the page-layout print function, thus uniquely corresponding to the page number of the intermediate data file. For instance, if logical pages in descending order LN to L1 are allocated to the page number 1 to N in the intermediate data file while assuming that C=1 in the layout Fn(C-up) of the physical page Fn, i.e. Fn(1-up), the data is printed in the descending order. The allocation of the logical pages to physical pages may be set in various ways. Thus, the layout in the output pages can be changed in many ways.

Next, the page editing process and character replacing process performed in the intermediate-data editing process in step S205 in FIG. 2 will be described with reference to FIG. 7.

Figure 7:
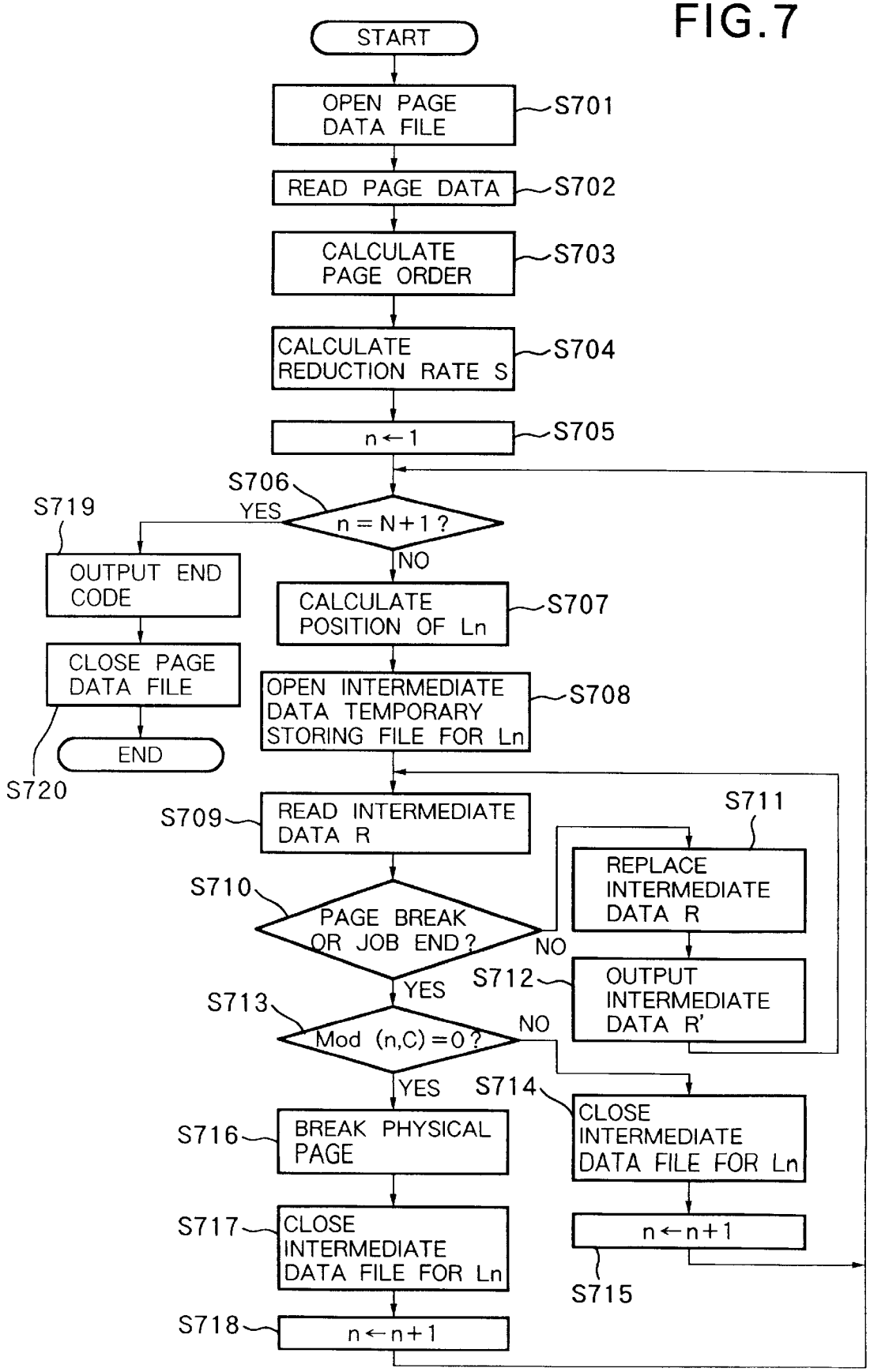
FIG. 7 is a flowchart showing an intermediate-data editing process.

FIG. 7 is a flowchart showing the intermediate-data editing process.

In step S701, a file where page data is temporarily stored is opened. In step S702, page data is read from the page data file. As described in FIG. 5, page data includes the number of total pages N, the file name Pn for the intermediate data file of each page, and the like.

In step S703, the logical page Ln is allocated to the page number of the intermediate data. The allocation is set by an operator at the time of print mode designation in step S201 in FIG. 2, and allocation is calculated based on the setting. More specifically, as described in the example in FIG. 6, if the descending page order is designated, the reversed order of logical page Ln is allocated to the page number of the intermediate data file.

In step S704, the reduction rate S of each logical page Ln, adopted when the pages are laid out on the physical page, is calculated. For instance, similar to the example described in FIG. 5, if C=9 (i.e. Fn(9-up)) is designated, the reduction rate S for each of the vertical and horizontal directions is set to S=⅓ or relatively smaller. In a case where three pages of logical pages are laid out equally in the vertical and horizontal directions, the reduction rate S is ⅓ in each direction. In a case where logical pages are not laid out equally, the reduction rate can be changed in accordance with the number of logical pages to be laid out.

In step S705, the page counter n for counting the logical page Ln is initialized to 1.

In step S706, it is determined whether or not the page counter n satisfies n=N+1 (N is the total number of logical pages). The total number of logical pages N coincides with the page number of the intermediate data file.

If n=N+1 is satisfied in step S706, it is determined that the editing process of all intermediate data file is completed. The process then proceeds to step S719 where an end code indicative of job end is outputted after the intermediate data file corresponding to the logical pages LN.

In step S720, the page data file is closed and the process ends.

If n=N+1 is not satisfied in step S706, the process proceeds to step S707 for calculating a position (reference position) for laying out the logical page Ln on the physical page. The reference position is expressed by a coordinates value which indicates a position on the physical page, e.g., where the top left corner of the logical page is arranged. The reference position is determined based on the number of pages C of the logical page Ln to be laid out on one sheet of the physical page, the layout order, and the logical page Ln of interest. Assume that the logical page of interest is L2 in the example of physical page shown in FIG. 6. In a case of the layout F1(9-up) where logical pages are arranged on the physical page from the top left to the right in the ascending order, the top left of the physical page is regarded as the origin of coordinates. Accordingly, the reference position can be calculated by the following equation:

coordinate x=left margin+(width of physical page−right margin−left margin)÷3 coordinate y=top margin Next, the process proceeds to step S708, and the intermediate data file corresponding to the logical page Ln is opened.

In step S709, the record in the intermediate data file is sequentially read, deriving it as "intermediate data R."In step S710, it is determined whether or not the intermediate data R read in step S709 is a [page break command] or a [job end command].

If it is determined in step S710 that the intermediate data R is not a [page break command] or a [job end command], the process proceeds to step S711 where the replacing process is performed on the read intermediate data R. In step S712, the intermediate data replaced in step S711 is defined as intermediate data R', and outputted to the intermediate data file for the editing process according to the reduction rate S calculated in step S704 and the reference position calculated in step S707.

In step S709, the record of the next intermediate data is obtained and defined as intermediate data R.

If the intermediate data R is a [page break command] or a [job end command] in the aforementioned step S710, the process proceeds to step S713. To determine whether or not to break the physical page, it is determined whether or not Mod(n, C)=0 holds. Herein, Mod(n, C) is a function for calculating the remainder of division, dividing the current logical page counter n by the number of logical pages C to be laid out on one sheet of physical page. If Mod(n, C)=0 does not hold in step S713, the process proceeds to step S714 where the intermediate data file, corresponding to the currently open logical page Ln, is closed.

In step S715, the logical page counter n is incremented by one (n=n+1) to advance the page and the process returns to step S706.

If Mod(n, C)=0 holds in step S713, the process proceeds to step S716 to break the physical page. More specifically, at the end of the intermediate data file which corresponds to the currently open logical page Ln, page-break record is recorded as intermediate data.

Next in step S717, the intermediate data file corresponding to the currently open logical page Ln is closed.

In step S718, the logical page counter n is incremented by one (n=n+1) to advance the page, and the process returns to step S706 to determine whether to continue or to end the process.

Next, the method of intermediate-data replacing process in step S711 is described with reference to FIG. 8.

Figure 8:
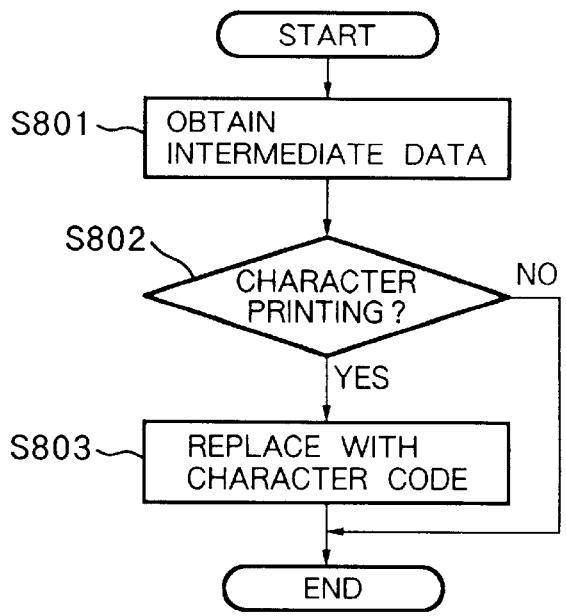
FIG. 8 is a flowchart showing an intermediate-data editing process.

FIG. 8 is a flowchart showing the intermediate-data editing process for replacing the [character print command]. In step S801, record R of the intermediate data is obtained. In step S802, it is determined whether or not the obtained intermediate data is a [character print command]. If it is determined as a [character print command] in step S802, the process proceeds to step S803. In step S803, the character code corresponding to the character print command is replaced with a predetermined character code, e.g., JIS (Japanese Industrial Standards) code 2125 "•" or JIS code 2220 "□", and the process ends.

If it is determined in step S802 that the intermediate data is not a [character print command], the process ends without performing the replacing process.

When a character is replaced, it is also possible to determine 1-byte code or 2-byte code and make the replacement with respective character codes. Moreover, the replacing process may be performed only on the characters having a size smaller than a predetermined point size.

As set forth above, the present embodiment enables generating intermediate data having a data form different from the print data, prior to generating print data for transmitting to the printer, temporarily storing the generated intermediate data, and generating print data based on the intermediate data. The generated intermediate data is controlled in the logical-page unit, and the logical pages are edited in accordance with the page layout. The editing process is performed such that a plurality of logical pages are reduced and laid out on the physical page. The replacement editing process performed on the intermediate data based on the character print command enables to reduce output data by replacing the character code with predetermined code data, whereby reducing the amount of data conversion at the time of printing brief contents of the entire page, thus reducing the time required for printing.

[Second Embodiment]

The second embodiment of the present invention will now be described with reference to FIG. 9. The basic construction and process operation of the print processing apparatus according to the second embodiment are identical to those described in the first embodiment shown in FIGS. 1 to 7. Therefore, description hereinafter is provided using these drawings. The second embodiment differs from the first embodiment in the intermediate-data replacing process performed in step S711 in FIG. 7. Herein, image rendering data is replaced and other processes are the same as that of the first embodiment.

In the second embodiment, when the print process of document data is designated by the application program, and if the image-replacing print mode and page layout print mode are designated, the intermediate-data writing program converts the document data transmitted by the application program into intermediate data, temporarily stores the intermediate data in an intermediate data file and generates a page data file where page data is recorded.

Then, the intermediate-data reading program reads each intermediate data file, and if the intermediate data is an image rendering command, the bit-map of the image is replaced with a rectangular rendering command or the like and outputted. Furthermore, the page layout process is performed and the page layout print process is executed. Then, the intermediate-data reading program outputs the intermediate data to the printer-control-command generating program (printer driver) or to a program executed in the previous step. Then, the printer-control-command generating program (printer driver) generates the printer control command (print data) and printing is performed.

The second embodiment differs from the first embodiment in the intermediate-data replacing process in step S711 in FIG. 7, and other processes are the same. Therefore, the method of replacing intermediate-data in step S711 only is described with reference to FIG. 9, and the rest of the processes will not be described.

Figure 9:
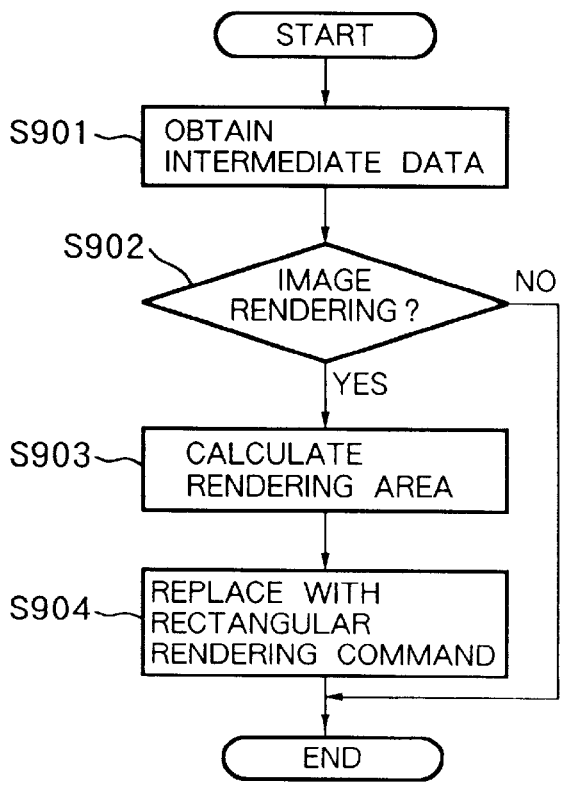
FIG. 9 is a flowchart showing an intermediate-data editing process according to the second embodiment of the present invention.

FIG. 9 is a flowchart showing the intermediate-data editing step where the image rendering command is replaced according to the second embodiment.

In step S901, record R (intermediate data R) of the intermediate data is obtained.

In step S902, it is determined whether or not the obtained intermediate data R is an image rendering command. If it is decided in step S902 that the intermediate data R is an image rendering command, the process proceeds to step S903 for calculating a rendering area of the image rendering command, i.e., coordinates of a top left corner of an image as a reference point and the width and height of the image.

In step S904, the image rendering command is replaced with a rectangular rendering command, having the coordinates of the reference point obtained in step S903 as the top left corner of the rectangular, and having the length and height of the image. Then, the process ends.

If it is determined in step S902 that the intermediate data is not an image rendering command, the process ends without performing the replacing process.

The command for replacing an image rendering command in step S903 is not limited to a rectangular rendering command, but may be a command to render a black rectangular or a hatched rectangular or the like, or may be an icon prepared in advance.

The replacement editing process performed on the intermediate data based on the image rendering command enables to reduce output data by replacing the image rendering area with a rectangular image or the like, whereby reducing the amount of data conversion at the time of printing brief contents of the entire page, thus reducing the time required for printing.

[Third Embodiment]

The third embodiment of the present invention will now be described with reference to FIG. 10.

Note that the basic construction and process operation of the print processing apparatus according to the third embodiment are identical to those described in the first embodiment shown in FIGS. 1 to 7. Therefore, description hereinafter is provided using these drawings. The third embodiment differs from the first embodiment in the intermediate-data replacing process performed in step S711 in FIG. 7. Herein, graphic data is replaced and other processes are the same as that of the first embodiment.

In the third embodiment, when the print process of document data is designated by the application program, and if the graphic-replacing print mode and page layout print mode are designated, the intermediate-data writing program converts the document data transmitted by the application program into intermediate data, temporarily stores the intermediate data in an intermediate data file and generates a page data file where page data is recorded.

Then, the intermediate-data reading program reads each intermediate data file. If the intermediate data is a graphic rendering command, the area where graphic is to be rendered is calculated, and the area is replaced with a rectangular rendering command or the like and outputted. Furthermore, the page layout process is performed and the page layout print process is executed. Then, the intermediate-data reading program outputs the intermediate data to the printer-control-command generating program (printer driver) or to a program executed in the previous step. Then, the printer-control-command generating program (printer driver) generates the printer control command (print data) and printing is performed.

The third embodiment differs from the first embodiment in the intermediate-data replacing process in step S711 in FIG. 7, and other processes are the same. Therefore, the method of replacing intermediate-data in step S711 only is described with reference to FIG. 10, and the rest of the processes will not be described.

Figure 10:
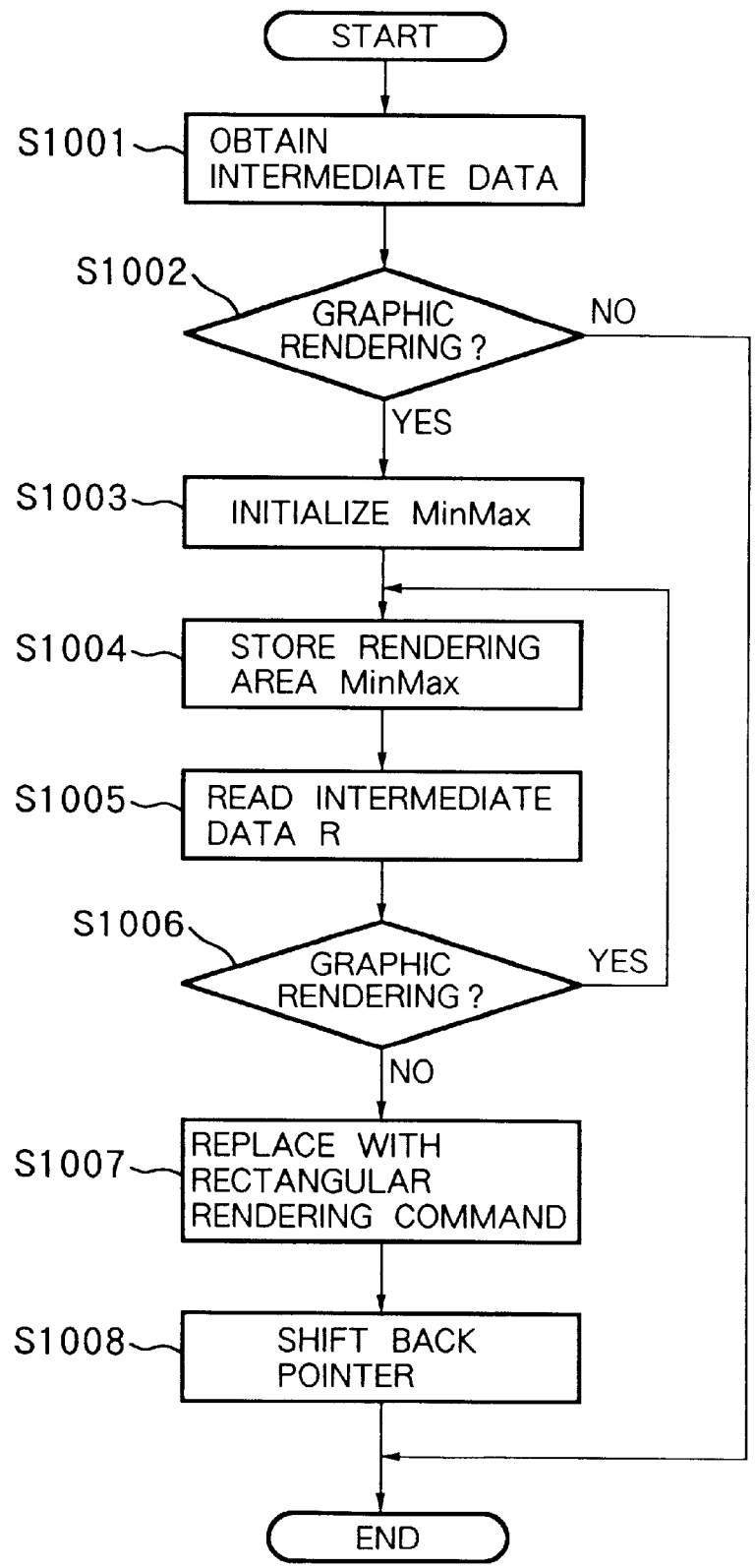
FIG. 10 is a flowchart showing an intermediate-data editing process according to the third embodiment of the present invention.

FIG. 10 is a flowchart showing the intermediate-data editing step where the graphic rendering command is replaced according to the third embodiment.

In step S1001, record R (intermediate data R) is obtained.

In step S1002, it is determined whether or not the obtained intermediate data R is a graphic rendering command.

If it is decided in step S1002 that the intermediate data R is a graphic rendering command, the process proceeds to step S1003 where a coordinates value MinMax is initialized. The MinMax indicates coordinates of the smallest and largest positions for calculating the graphic rendering area.

In step S1004, the rendering area for the graphic rendering command is obtained and stored as the first MinMax value.

In step S1005, the next intermediate-data record R is read. In graphic rendering, since a number of rendering commands, e.g., rendering a straight line, an arc, a rectangular, a polygon and so on, must be serially processed, the next intermediate data is read herein to obtain the MinMax value of a plurality of serial rendering commands.

In step S1006, it is determined whether or not the intermediate data read in step S1005 is a graphic rendering command. If the intermediate data is a graphic rendering command in step S1006, the process returns to step S1004 and a new MinMax value is calculated based on the previously obtained MinMax value and the rendering area for the graphic rendering command this time.

If it is determined in step S1006 that the intermediate data is not a graphic rendering command, the process proceeds to step S1007 where the current MinMax value is defined as the rectangular area, and the serial graphic rendering commands are replaced with the rectangular rendering command.

In step S1008, the pointer for reading the intermediate data record is shifted to the one before so as not to skip the intermediate data read this time, when the next intermediate data record is read in step S709 in FIG. 7.

If it is determined in the aforementioned step S1002 that the intermediate data is not a graphic rendering command, the process ends without performing the replacing process. The command for replacing a graphic rendering command in step S1007 is not limited to a rectangular rendering command, but may be a command to render a black rectangular or hatched rectangular or the like, or may be an icon prepared in advance.

The replacement editing process performed on the intermediate data based on the graphic rendering command enables to reduce output data by replacing the graphic rendering area with a rectangular image or the like, whereby reducing the amount of data conversion at the time of printing brief contents of the entire page, thus reducing the time required for printing.

[Fourth Embodiment]

The fourth embodiment of the present invention will now be described. Note that the basic construction and process operation of the print processing apparatus according to the fourth embodiment are identical to those described in the first embodiment shown in FIGS. 1 to 7. Therefore, description hereinafter is provided using these drawings.

The fourth embodiment realizes the combination of the character-print command replacement according to the first embodiment, the image-rendering command replacement according to the second embodiment, and the graphic-rendering command replacement according to the third embodiment. More specifically, when the print process of document data is designated by the application program, and if the graphic-replacing print mode and page layout print mode are designated, the intermediate-data writing program converts the document data transmitted by the application program into intermediate data, temporarily stores the intermediate data in an intermediate data file and generates a page data file where page data is recorded. Then, the intermediate-data reading program reads each intermediate data file. If the intermediate data is a character print command, the character code is replaced with a predetermined character code and outputted. If the intermediate data is an image rendering command, the bit map of the image is replaced with a rectangular rendering command or the like and outputted. If the intermediate data is a graphic rendering command, the graphic rendering area is calculated, the area is replaced with a rectangular rendering command or the like and outputted.

Furthermore, the page layout process is performed and the page layout print process is executed. Then, the intermediate-data reading program outputs the intermediate data to the printer-control-command generating program (printer driver) or to a program executed in the previous step. Then, the printer-control-command generating program (printer driver) generates the printer control command (print data) and printing is performed.

The fourth embodiment achieves the image-rendering-command replacing process described in the flowchart in FIG. 9 and the graphic-rendering-command replacing process described in the flowchart in FIG. 10 in addition to the intermediate-data replacing process described in the first embodiment.

The present invention can be applied to a system constituted by a plurality of devices (e.g., host computer, interface, reader, printer) or to an apparatus comprising a single device (e.g., copy machine, facsimile).

Furthermore, the invention is applicable also to a case where the invention is embodied by supplying a program to a system or an apparatus. In this case, a storage medium, storing a program according to the invention constitutes the invention, and the program is loaded from the storage medium to the system or apparatus. The system or apparatus installed with the program read from the medium realizes the functions according to the invention.

Although the first to fourth embodiments of the present invention have exemplified the case in which the print processing program and related data are loaded directly from the floppy disk (FD) 8 to the RAM 12, the print processing program and related data may be installed in advance from the floppy disk (FD) 8 to the hard disk (HD) and may be loaded from the hard disk (HD) to the RAM 12 when the print processing program is executed.

Not only a floppy disk, but a magnetic tape, CD-ROM, an IC memory card, a digital video disk (DVD) or the like may serve as the storage medium.

In addition, the present print program may be stored in ROM 13 so as to become a part of the memory map, and may be executed directly by the CPU 11.

The object of the present invention can also be achieved by providing a system or an apparatus with a storage medium storing software program codes realizing the functions described in the above embodiments, and reading the program codes stored in the storage medium by a computer (CPU or MPU) of the system or apparatus, then executing the program codes.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

[Other Embodiments]

Figure 13:
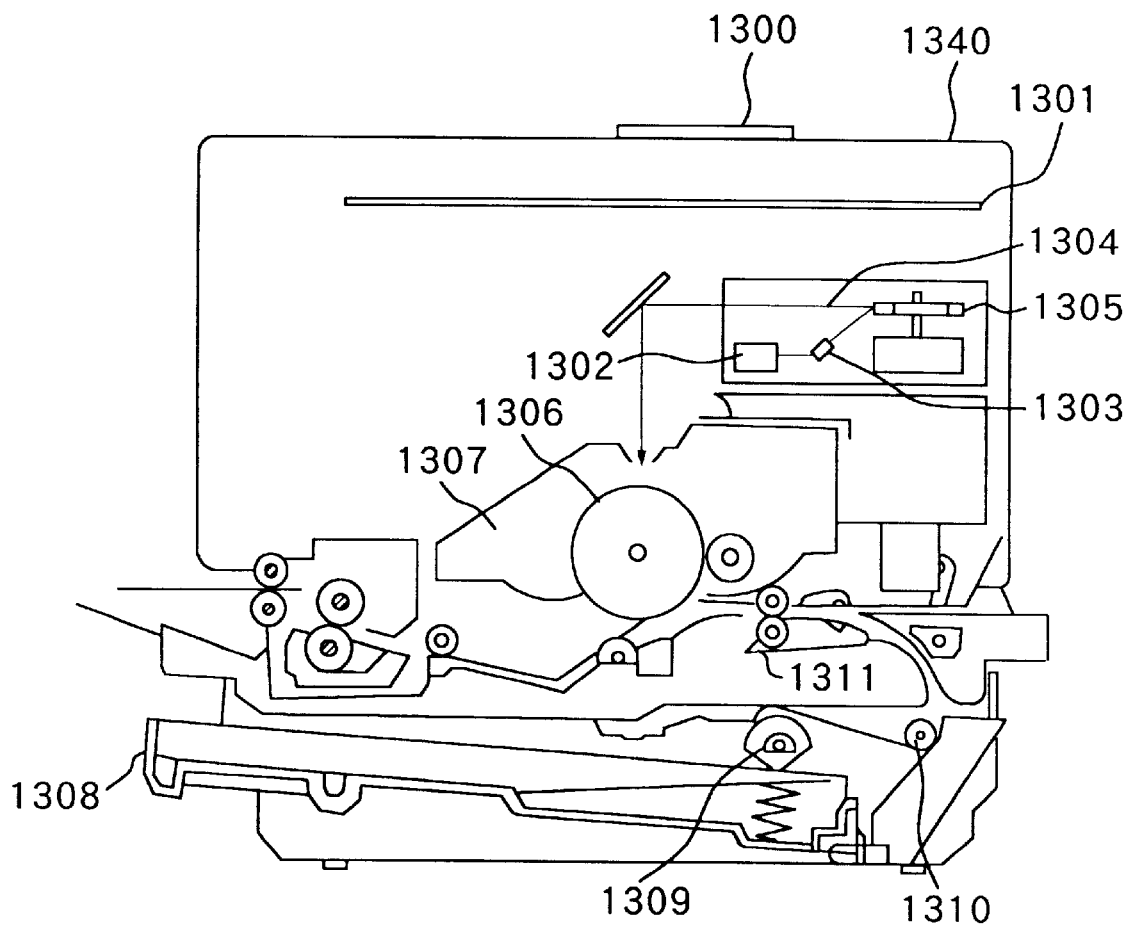
FIG. 13 is a cross-sectional view showing a structure of a laser bean printer.

A laser beam printer is also applicable as a printing apparatus which realizes the functions of the above-described embodiments. FIG. 13 is a cross-sectional view showing the internal structure of the laser beam printer (hereinafter referred to as LBP) capable of printing character pattern data or the like on a recording sheet.

In FIG. 13, reference numeral 1340 denotes an LBP main body which forms an image on a recording sheet as a recording medium, based on inputted character patterns and the like. Reference numeral 1300 denotes an operation panel on which operation switches and LED (light emitting diode) displays and the like are arranged; and 1301, a printer control unit for controlling the entire LBP 1340 and interpreting character pattern data or the like. The printer control unit 1301 mainly converts character pattern data into video signals and outputs the video signals to a laser driver 1302.

The laser driver 1302 is a circuit for driving a semiconductor laser unit 1303. The laser driver 1302 turns ON/OFF a laser beam 1304 emitted by the semiconductor laser unit 1303 in accordance with the inputted video signals. A rotatable polygon mirror 1305 reflects the laser beam 1304 in a left-right direction so that the laser beam 1304 scans on an electrostatic drum 1306. In this manner, an electrostatic latent image of a character pattern is formed on the electrostatic drum 1306. A developing unit 1307 arranged around the electrostatic drum 1306 develops the latent image and transfer the image onto a recording sheet. The recording sheet is a cut-sheet type recording sheet set in a plurality of cassettes 1308 whose sizes vary to hold various types of recording sheet. The recording sheet is fed into the printing apparatus by a paper feeding roller 1309, conveyance rollers 1310 and 1311, and supplied to the electrostatic drum 1306.

Figure 14:
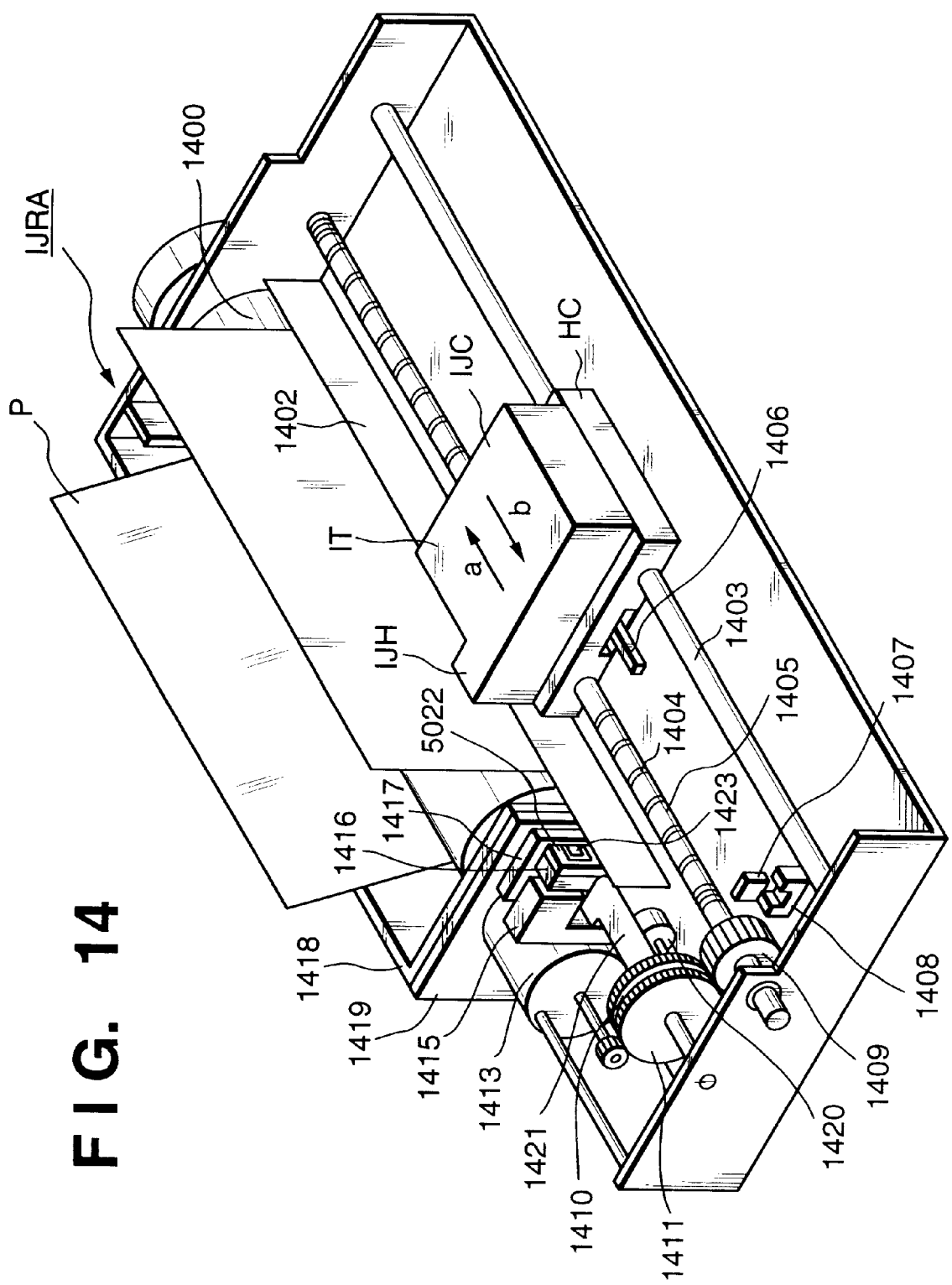
FIG. 14 is a perspective view of an ink-jet printing apparatus.

Although the laser beam printer is exemplified as a printing apparatus which realizes the function of the above-described embodiments, the present invention is not limited to this, but is applicable to an ink-jet printer described below. FIG. 14 is a perspective view of an ink-jet printing apparatus IJRA capable of feeding plural types of recording paper (not shown) in response to a print job. In FIG. 14, a carriage HC engages with a spiral groove 1404 of a lead screw 1405, which rotates via driving force transmission gears 1411 and 1409 upon forward/reverse rotation of a driving motor 1413. The carriage HC has a pin (not shown), and is reciprocally scanned in the directions of arrows a and b. On the carriage HC, an ink-jet cartridge IJC is mounted. Reference numeral 1402 denotes a sheet pressing plate which presses a recording sheet against platen 1400, ranging from one end to the other end of the scanning path of the carriage HC. Reference numerals 1407 and 1408 denote photocouplers which serve as a home position detector for recognizing presence of a lever 1406 of the carriage in a corresponding region, and are used for switching, e.g., the rotating direction of the motor 1413. Reference numeral 1416 denotes a member for supporting a cap member 1422 which caps the front surface of the printhead IJH; and 1415, a suction device for sucking ink residue through the interior of the cap member. The suction device 1415 performs suction recovery of the printhead via an opening 1423 of the cap member. Reference numeral 1417 denotes a cleaning blade; and 1419, a member which allows the blade to be movable in the back-and-forth direction of the blade. These members are supported by a main unit support plate 1418. The blade is not limited to the above-described form, but a known cleaning blade is applicable to the present invention. Reference numeral 1421 denotes a lever for initiating suction recovery operation. The lever 1421 moves in conjunction with the movement of a cam 1420 which engages with the carriage, and receives a driving force from the driving motor via a known transmission mechanism such as clutch switching. The capping, cleaning, and suction recovery operation are performed at their corresponding positions upon operation of the lead screw 1405 when the carriage reaches the homeposition area. However, the present invention is not limited to this arrangement as long as the desired operation is performed at known timing.

Figure 15:
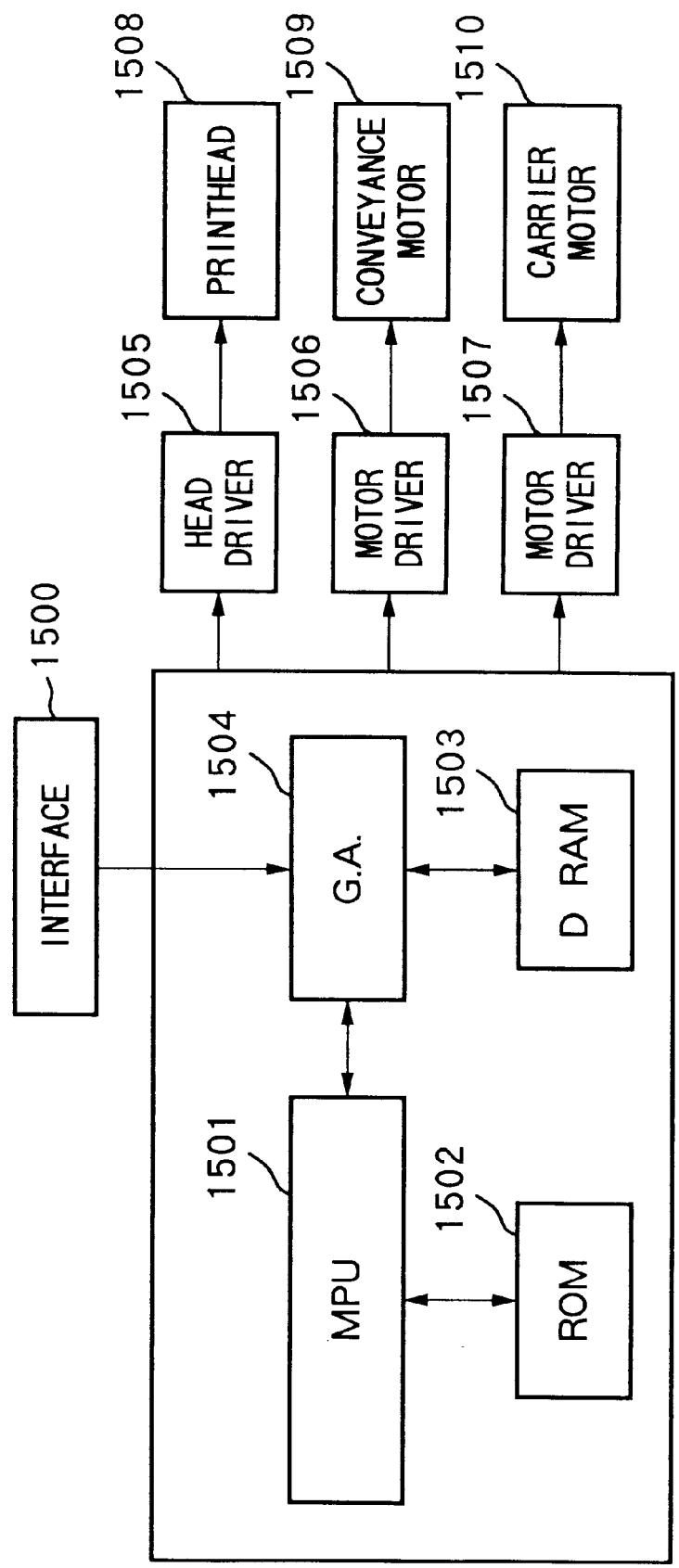
FIG. 15 is a block diagram for explaining the printer operation.

Next, description will be provided on a control circuit for executing print control of the above-described printing apparatus with reference to the block diagram in FIG. 15. Referring to the control circuit in FIG. 15, reference numeral 1500 denotes an interface unit for inputting print signals; 1501, MPU; 1502, ROM for storing a control program executed by the MPU 1501; and 1503, dynamic RAM for storing various data (aforementioned print signals, print data supplied to the printhead or the like). Reference numeral 1504 denotes a gate array for performing supply control of print data to the printhead 1508. The gate array 1504 also performs data transfer control among the interface 1500, MPU 1501, and the RAM 1503. Reference numeral 1510 denotes a carrier motor for conveying a printhead 1508; and 1509, a conveyance motor for conveying a recording sheet. Reference numeral 1505 denotes a head driver for driving the printhead; and 1506 and 1507, motor drivers for respectively driving the conveyance motor 1509 and the carrier motor 1510.

The operation of the above-described control structure is described. When a print signal is inputted to the interface 1500, the print signal is converted to print data by the gate array 1504 and the MPU 1501 intercommunicating with each other. As the motor drivers 1506 and 1507 are driven, the printhead is driven in accordance with the print data transferred to the head driver 1505, thereby performing printing.

The structural components of the present invention can be incorporated in the above-described control structure of the ink-jet printer. Thus, it is apparent that the present invention is applicable not only to a laser-beam printer, but also to the above-described ink-jet printing apparatus.

The present invention is not limited to the above embodiments and various changes and modifications can be made within the spirit and scope of the present invention. Therefore, to appraise the public of the scope of the present invention, the following claims are made.

What is claimed is:

1. A print processing method comprising:
  a print mode designating step of designating a print mode;
  a print designating step of designating print data to be transmitted to a printing apparatus based on instruction of print execution;
  a page control determining step of determining whether or not page control is to be performed in accordance with the designated print mode;
  an intermediate data generating step of generating intermediate data from the print data for performing page control based on a determination result of said page control determining step;
  a storing step of storing the generated intermediate data;
  a page data recording step of recording page data corresponding to the intermediate data;
  an intermediate data editing step of editing the stored intermediate data in accordance with the designated print mode;
  an intermediate data replacing step of replacing the stored intermediate data;
  an intermediate data outputting step of outputting intermediate data edited in said intermediate data replacing step;
  a print data generating step of generating final print data based on the outputted intermediate data and the page data corresponding to the intermediate data; and
  a print data outputting step of outputting the generated final print data.

2. The print processing method according to claim 1, wherein in said intermediate data editing step, a plurality of pages are reduced to be laid out in one page.

3. The print processing method according to claim 1, wherein in said intermediate data replacing step, if the intermediate data is a character print command, the character code is replaced with a predetermined character code.

4. The print processing method according to claim 1, wherein in said intermediate data replacing step, if the intermediate data is an image rendering command, the image rendering command is replaced with a rectangular rendering command.

5. The print processing method according to claim 1, wherein in said intermediate data replacing step, if the intermediate data is a graphic rendering command, the graphic rendering command is replaced with a rectangular rendering command.

6. The print processing method according to claim 1, wherein the print mode designation and the print execution instruction are performed by a keyboard.

7. The print processing method according to claim 1, wherein the print mode designation and the print execution instruction are performed by a pointing device.

8. A print processing apparatus comprising:
  print mode designating means for designating a print mode;
  print designating means for designating print data to be transmitted to a printing apparatus based on instruction of print execution;
  page control determining means for determining whether or not page control is to be performed in accordance with the designated print mode;
  intermediate data generating means for generating intermediate data from the print data for performing page control based on a determination result of said page control determining means;
  storing means for storing the generated intermediate data;
  page data recording means for recording page data corresponding to the intermediate data;
  intermediate data editing step of editing the stored intermediate data in accordance with the designated print mode;
  intermediate data replacing means for replacing the stored intermediate data;
  intermediate data outputting means for outputting intermediate data edited by said intermediate data replacing means;
  print data generating means for generating final print data based on the outputted intermediate data and the page data corresponding to the intermediate data; and print data outputting means for outputting the generated final print data.

9. The print processing apparatus according to claim 8, wherein said intermediate data editing means reduces a plurality of pages to be laid out in one page.

10. The print processing apparatus according to claim 8, wherein said intermediate data replacing means replaces a character code with a predetermined character code if the intermediate data is a character print command.

11. The print processing apparatus according to claim 8, wherein said intermediate data replacing means replaces an image rendering command with a rectangular rendering command if the intermediate data is an image rendering command.

12. The print processing apparatus according to claim 8, wherein said intermediate data replacing means replaces a graphic rendering command with a rectangular rendering command if the intermediate data is a graphic rendering command.

13. The print processing apparatus according to claim 8, wherein the print mode designation and the print execution instruction are performed by a keyboard.

14. The print processing apparatus according to claim 8, wherein the print mode designation and the print execution instruction are performed by a pointing device.

15. A computer readable storage medium comprising:

program steps of print mode designating means for designating a print mode;

program steps of print designating means for designating print data to be transmitted to a printing apparatus based on instruction of print execution;

program steps of page control determining means for determining whether or not page control is to be performed in accordance with the designated print mode;

program steps of intermediate data generating means for generating intermediate data from the print data for performing page control based on a determination result of said page control determining means;

program steps of storing means for storing the generated intermediate data;

program steps of page data recording means for recording page data corresponding to the intermediate data;

program steps of intermediate data editing step of editing the stored intermediate data in accordance with the designated print mode;

program steps of intermediate data replacing means for replacing the stored intermediate data;

program steps of intermediate data outputting means for outputting intermediate data edited by said intermediate data replacing means;

program steps of print data generating means for generating final print data based on the outputted intermediate data and the page data corresponding to the intermediate data; and program steps of print data outputting means for outputting the generated final print data.

16. The storage medium according to claim 15, further comprising a program for causing said intermediate data editing means to reduce a plurality of pages to be laid out in one page.

17. The storage medium according to claim 15, further comprising a program for causing said intermediate data replacing means to replace a character code with a predetermined character code if the intermediate data is a character print command.

18. The storage medium according to claim 15, further comprising a program for causing said intermediate data replacing means to replace an image rendering command with a rectangular rendering command if the intermediate data is an image rendering command.

19. The storage medium according to claim 15, further comprising a program for causing said intermediate data replacing means to replace a graphic rendering command with a rectangular rendering command if the intermediate data is a graphic rendering command.

20. The storage medium according to claim 15, further comprising a program for designating and instructing a data processing apparatus to execute the print mode and print execution designated by a keyboard.

21. The storage medium according to claim 15, further comprising a program for designating and instructing a data processing apparatus to execute the print mode and print execution designated by a pointing device.

* * * * *